United States Patent Office 2,781,302
Patented Feb. 12, 1957

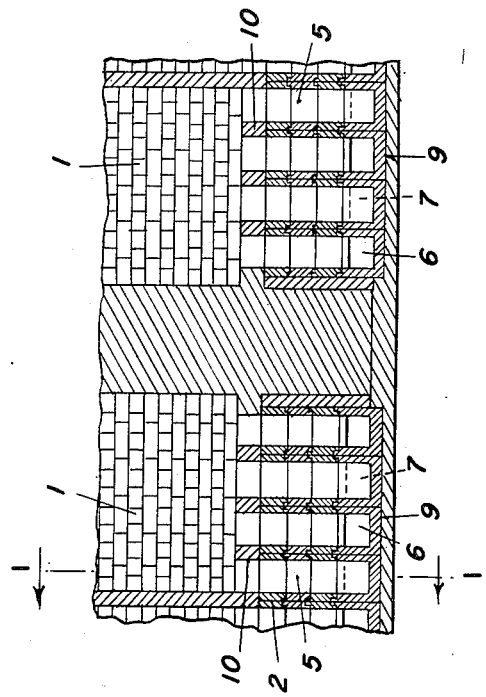
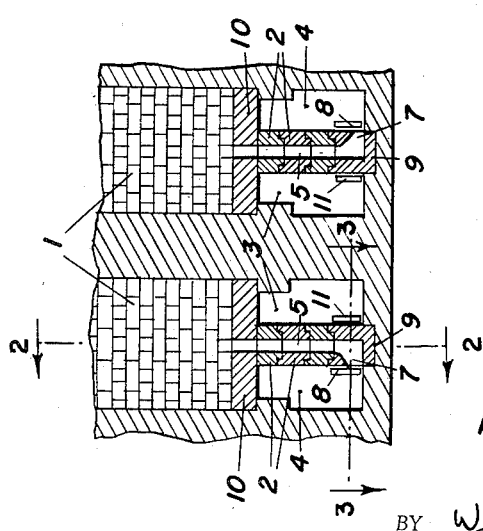
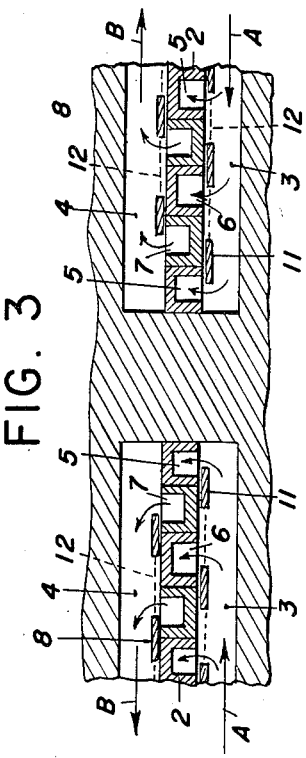
INVENTORS
**ARTHUR STEDING &
HEINRICH HARTEWIG**

2,781,302

REGENERATIVE COKE OVEN STRUCTURE

Arthur Steding, Bochum, and Heinrich Hartewig, Essen, Germany, assignors to Didier-Kogag-Hinselmann, Koksofenbau und Gasverwertung A. G., Essen, Germany Application August 20, 1952, Serial No. 305,352
In Germany June 29, 1949

Public Law 619, August 23, 1954
Patent expires June 29, 1969

4 Claims. (Cl. 202—141)

The present invention relates to improvements in regenerative coke oven structure. More particularly, it has especial relation to a partition wall construction arranged in the channel under the respective regenerator chambers, subdividing such channel into a supply channel and a discharge channel, and providing a plurality of successive vertical passageways which are interconnected alternately with the supply channel and with the discharge channel.

It has been found, by experience, to be difficult—in the alternate-flow type of horizontal coke oven, provided with vertical heating flues and vertically or substantially vertically traversed regenerator chambers—to distribute the heating agent (e. g. water gas and air) on the one hand and the waste gases on the other hand; throughout the extent of the regenerator chambers so that uniform heat transfer is achieved in all parts of these chambers during the upward flow as well as during the downward flow therethrough. In addition to differences in draft which are usually encountered in different parts of the regenerators, the heating media (e. g. water gas and air) and the waste gases involve differences in quantity, temperature and concentration which have to be taken into account in the flow of the respective gases in the two directions.

A primary object of the present invention is the embodiment of regenerative coke oven structure wherein substantially uniform heat transfer may be achieved in all parts of the regenerator chambers during the upward flow as well as during the downward flow therethrough. To this end, means have already been provided for the separate regulation and control of the heating media and of the waste gases. The present invention is concerned with a novel and particularly advantageous arrangement for the regulation and control of the heating agent (e. g. water gas and air) to be supplied to each regenerator chamber, separately from the regulation and control of the waste gases discharged from such regenerator chamber following change in direction of flow, in order thus to be able to assure a constantly uniform regenerator flow in each direction and thereby to realize the aforesaid desideratum.

By the arrangement according to the invention the channel under each regenerator chamber is subdivided, by a partition wall consisting of a linear series of vertically superposed hollow blocks, into a supply channel for heating media (e. g. gas and air) and a discharge channel for waste gas, the thus-formed successively-positioned, upwardly-open vertical passageways or conduits terminating at their lower ends alternately in the gas-air supply channel and in the waste gas withdrawal channel.

In this way, an easily-erected and statically strong and secure—(notwithstanding the fact that it comprises a large number of passageways)—supporting wall for the checkerwork of the regenerator chambers is provided, which simultaneously subdivides the channel beneath such chambers in the desired manner. The vertical conduits formed by the hollow blocks and having bottom terminal outlets opening alternately into the two halves of the channel beneath the regenerator chambers, make possible a simple throttling of the individual passageways and the operation of such throttling from the exterior. It is advantageous to position the bottom terminal outlets (or inlets) directly above the floor of the channel beneath the regenerator chambers, so that the regulation of the area of the openings of the individual terminal outlets or inlets can be effected with the aid of closure blocks slidably resting on said floor. However, the throttling can also be effected in any other suitable manner from the exterior, as for example through a conduit extending to the exterior through the bottom.

The construction according to the invention makes it possible to dispose the heating medium supply channel and the waste gas withdrawing channel in juxtaposition to each other in a manner capable of easy construction and easy operation and, moreover, to position such channels under the regenerator chambers, all without having to sacrifice cross-sectional size of said channels, i. e. while retaining adequate cross-sectional size thereof. The regenerator chamber walls bounding the said channels are constructed of their usual unchanged wall thickness so that, as regards adjacent supply channels for air and combustible gas, there is no possibility of undesired flow of heating media from one to the other, and this avoids undesired premature combustion without the necessity of expensive and difficultly-insertible metal inserts in the partition walls. The arrangement according to the present invention for the separate regulation and control of the gaseous flow media requires no constructional reduction in the size of the regenerator chambers. The latter may be constructed in its full width according to the distance between the longitudinal axes of the chambers. Chambers of such width are not only easily accessible, but can also be filled with checkerwork brick of a configuration of relatively larger cross-section, e. g. with brick which is star-shaped in cross-section, the resultant increased surface, as compared with that of the usual rectangular brick, giving a considerably higher efficiency of heat recovery.

Each regenerator chamber may be subdivided, as many times as desired, into individual sections by means of transverse partitions, positioned between two successive vertical passageways, without requiring any change in the construction or operation of the regulating device according to the invention. These transverse partitions are, in fact, desirable inasmuch as they prevent an undesired diagonal flow in the regenerator chamber. Such transverse partitions may be provided in any number, so that the regulation and control means according to the invention can be used in half-separated as well as in groupwise subdivided regenerative ovens and also in regeneratively heated ovens with individual regenerators.

For a better understanding of the invention, reference is made to a presently-preferred embodiment thereof shown, by way of example, on the accompanying sheet of drawings wherein:

Fig. 1 represents, in somewhat diagrammatic form, a vertical cross-section of the lower regenerator portion of a horizontal regenerative coke oven, taken along line 1—1 of Fig. 2;

Fig. 2 represents, in somewhat diagrammatic form, a longitudinal vertical section through the said regenerator portion, taken along line 2—2 of Fig. 1; and Fig. 3 represents, in somewhat diagrammatic form, a longitudinal horizontal section through the said regenerator portion, taken along line 3—3 of Fig. 1.

The bottom channel positioned under each regenerator chamber 1 is subdivided by a partition wall constructed of a linearly arranged series of vertically superposed hollow block 2, into a supply channel 3 for air and combustible gas and a discharge channel 4 for waste gases.

The blocks 2 of each superposed set are provided with corresponding shoulders and recesses, as shown in Figs. 1 and 2, whereby correct positioning thereof and retention in such position are assured. The lowermost block of each vertical set is seated in a corresponding recess 9 provided in the floor of the channel beneath the regenerator chambers. In this way, the partition wall is provided with a large number of successively arranged vertical passageways 5. As shown on the drawings, each of these passageways is in alinement at the top thereof with a vertical duct or bore extending through the bottom wall 10 of the respective regenerator chambers. Moreover, the lowermost one of each vertical set of hollow blocks 2 is provided with a lateral opening in the side wall thereof rather than with an opening in its lower end. Moreover, the lateral openings connect alternately with channel 3 and with channel 4. Thus, by the simple expedient of moving the closure members 8, arranged in channel 4 adjacent the respective lateral openings interconnecting channel 4 with the corresponding passageways 5, into closure position (shown in Fig. 3), the waste gas channel is effectually disconnected from the regenerator chamber 1. During this period, the closure members 11 in the heating gas and air supply channel 3 are in the "open" position, i. e. removed from in front of their respective lateral openings to and from the corresponding passageways 5. With this arrangement, the heating media supplied flows in the direction of arrows A (Fig. 3) and upwardly through the chamber 1. By closing the lateral openings which open into channel 3 and by closing those which open into channel 4—which is done when the flow is of waste gas downwardly through the regenerator chamber 1—the waste gases flow in the direction of arrows B (Fig. 3). Any suitable and per se conventional means (indicated by dotted lines 12), operative from the exterior of the oven, may be utilized for moving the closure members, which may be of refractory material or the like, may be employed.

Having thus disclosed the invention, what is claimed is:

1. In a regenerative coke oven of the character described having a regenerator chamber through which gaseous heating media and waste gases alternately flow in opposite directions, said regenerator chamber having a lower wall defining the top wall of a channel beneath said regenerator chamber, the improvement comprising a partition wall extending longitudinally through said channel and throughout its entire vertical extent from floor to top wall and subdividing the latter into a supply channel for supplying gaseous heating media to said regenerator chamber in one direction of flow and into a discharge channel for the withdrawal of waste gases from said regenerator chamber in the opposite direction of flow, said partition wall being provided with a plurality of successive vertical passageways extending therethrough and separated from each other, said passageways being in communication at the top thereof with said regenerator chamber, successive passageways opening adjacent the bottom thereof alternately only into said supply channel and only into said discharge channel, and means for disconnecting each said passageway from its respective channel.

2. A relationship of parts according to claim 1, wherein each said passageway is defined by a vertically superposed set of hollow blocks, adjacent blocks of said set having a shoulder-and-recess interengagement with each other, whereby the blocks are retained in alinement.

3. A relationship of parts according to claim 1, wherein each said passageway is defined by a vertically superposed set of hollow blocks, adjacent blocks having a shoulder-and-recess interengagement with each other, whereby the blocks are retained in alinement, the lowermost block having a lateral opening interconnecting the passageway with an adjacent channel, alternate openings being on opposite sides.

4. A relationship of parts according to claim 1, wherein said bottom openings of said passageways are adjacent the floor of said first-mentioned channel, and said means are supported on and slidable along said floor.

References Cited in the file of this patent

UNITED STATES PATENTS

| 1,055,536 | Hughes | Mar. 11, 1913 |
| 1,393,455 | Rugg | Oct. 11, 1921 |
| 1,436,098 | Hiby | Nov. 21, 1922 |
| 1,635,679 | Kus | July 12, 1927 |
| 1,928,607 | Van Ackeren | Sept. 26, 1933 |
| 1,986,904 | Topzek | Jan. 8, 1935 |
| 2,011,592 | Reppekus | Aug. 20, 1935 |

FOREIGN PATENTS

| 908,368 | Germany | Apr. 5, 1954 |